United States Patent [19]

Boyer

[11] 4,315,833

[45] Feb. 16, 1982

[54] ARC SPUTTERING METHOD OF MAKING COLLOIDAL MAGNESIUM SOL AND APPARATUS THEREFOR

[76] Inventor: Winston Boyer, The Boyer Ranch, Savery, Wyo. 82332

[21] Appl. No.: 100,233

[22] Filed: Dec. 4, 1979

Related U.S. Application Data

[62] Division of Ser. No. 881,388, Feb. 27, 1978, Pat. No. 4,214,615.

[51] Int. Cl.³ ............................ B01J 13/00; B01F 7/22
[52] U.S. Cl. ......................................... 252/314; 44/51; 252/309; 252/359 B
[58] Field of Search .................... 252/309, 314, 359 A, 252/359 B; 44/51; 204/192 R, 298

[56] References Cited

U.S. PATENT DOCUMENTS

| | | | |
|---|---|---|---|
| 1,910,212 | 5/1933 | Brown | 252/314 |
| 2,314,561 | 3/1943 | Skowronski | 242/314 X |
| 2,927,849 | 3/1960 | Greblick et al. | 44/62 |
| 3,556,976 | 1/1971 | Ishibashi | 204/172 X |
| 4,080,177 | 3/1978 | Boyer | 44/51 |
| 4,080,178 | 3/1978 | Boyer | 44/51 |
| 4,080,179 | 3/1978 | Boyer | 44/51 |

*Primary Examiner*—Richard D. Lovering

[57] ABSTRACT

A colloidal magnesium sol is formed in metered amounts, e.g., 2 g, 3 g or 4 g per 500 cc of kerosene, by arc sputtering magnesium metal electrodes under kerosene until predetermined lengths of electrodes are converted to sol. The unit volume of 500 cc is under the hood of a vehicle or over the gas tank in the trunk space for injection of the colloidal magnesium sol suspension into the fuel line either from the fuel tank or between the fuel tank and the carburetor of an internal combustion engine. The dosages required for gasoline powered automotive vehicles are set out in my copending application, WB-1, Ser. No. 569,320, filed Apr. 17, 1975 now U.S. Pat. No. 4,080,179. The dosages required for jet fuel powered aircraft are set out in my copending application, WB-2, Ser. No. 568,999, filed Apr. 17, 1975 now U.S. Pat. No. 4,080,178. The dosages required for diesel engines are set out in my copending application, WB-3, Ser. No. 568,998, filed Apr. 17, 1975 now U.S. Pat. No. 4,080,177. The dosage is uniquely dispensed in the desired amount in the unit dosage package of 500 cc for automobiles, 1,000 cc for diesel trucks, and 5,000 cc for jet aircraft.

8 Claims, 6 Drawing Figures

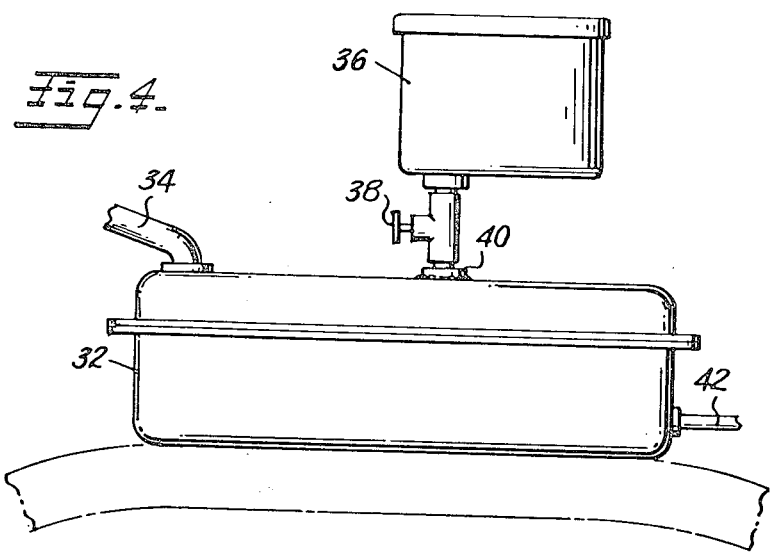
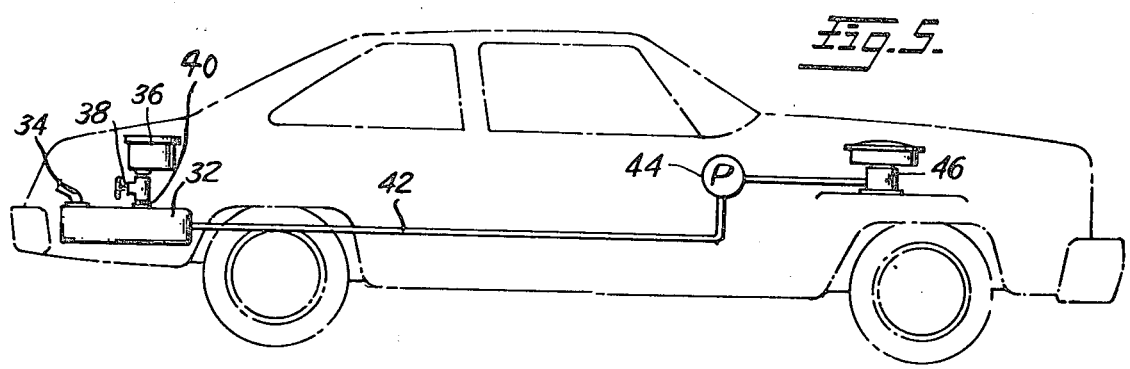
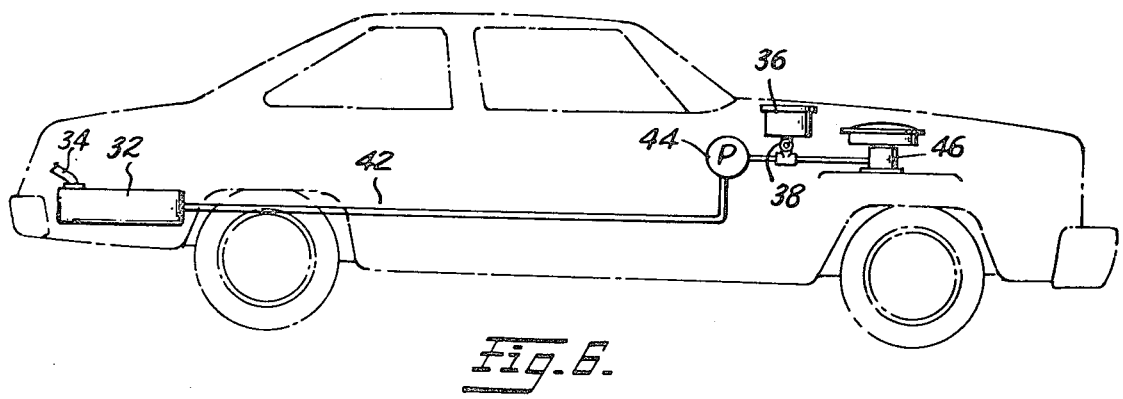

ARC SPUTTERING METHOD OF MAKING COLLOIDAL MAGNESIUM SOL AND APPARATUS THEREFOR

CROSS REFERENCE TO RELATED APPLICATIONS

This is a division of application Ser. No. 881,388, filed Feb. 27, 1978, now U.S. Pat. No. 4,214,615 issued July 29, 1980.

Application of Winston Boyer entitled "Colloidal Magnesium Suspension in Critical Low Concentration in Motor Gasoline and Method of Preparation", Ser. No. 569,320, filed Apr. 17, 1975, now U.S. Pat. No. 4,080,179. (WB-1)

Application of Winston Boyer entitled "Colloidal Magnesium Suspension in Critical Low Concentration in Diesel Fuel", Ser. No. 568,999, filed Apr. 17, 1975, now U.S. Pat. No. 4,080,178. (WB-2)

Application of Winston Boyer entitled "Colloidal Magnesium Suspension in Critical Low Contration in Jet Fuel", Ser. No. 568,998, filed Apr. 17, 1975, now U.S. Pat. No. 4,080,177. (WB-3)

BACKGROUND OF THE INVENTION (A) Field of the Invention

The invention lies in the field of making unit dosage packages of colloidal sols by arc sputtering of pure magnesium metal and is for the purpose of improving the metering of critical low concentrations of colloidal magnesium in gasoline, diesel fuel and jet aircraft fuel. The invention also lies in the field of portable dispensing devices for delivering colloidal magnesium as an ignition additive as pure magnesium to the conventional hydrocarbon fuel of an internal combustion engine in a vehicle, in particular automobile, diesel or jet aircraft piston engines, in which the additive is prepared by arc sputtering. Dispensing may be directly into the fuel tank or into the fuel line between the fuel pump and the carburetor. The invention serves the need of providing a more practical method at lower cost to supply critical concentrations in my prior patent applications.

(B) Description of the Prior Art

The prior art literature and text books recognize arc sputtering devices for creating colloidal suspensions.

(1) Prior Art Showing Arcing of Electrodes to Make Colloids

The manufacture of colloids is shown in Brown, U.S. Pat. No. 1,910,212, and shows arc sputtering between silica electrodes or selenium electrodes or selenium electrodes to make the non-conductive material conductive in the presence of a reducing agent.

(2) Prior Electrical Devices for Cracking Fuel

Electrical devices for upgrading liquid hydrocarbon fuels are known and may be in a form for attachment to an automobile. Some of these devices work on the principal of cracking the hydrocarbon fuel into fractions by the action of electricity, for example U.S. Pat. No. 4,011,843, which vaporizes fuel by passing electrical current fed by the car storage battery into an emulsion of gasoline or water.

Another example of electric treatment apparatus intended to break down gasoline into higher octane fractions is found in U.S. Pat. No. 1,992,310 which uses an electrolytic treatment of gasoline in a cell containing sulfuric acid electrolyte, a platinum anode and a lead cathode.

(3) Prior Apparatus for Space Charge Cracking of Hydrocarbon

A further example is the apparatus in U.S. Pat. No. 2,766,582 in which an electrical space charge is created in the fuel prior to spraying the fuel through a nozzle in the form of a jet stream.

Still another example is U.S. Pat. No. 3,556,976 in which the apparatus cracks low grade gasoline into gaseous products which are fed into the internal combustion chamber of the vehicle.

(4) Prior Art Showing Metal and Metalloid Additives

In Grebleck et al, U.S. Pat. No. 2,927,849, there is disclosed particles of magnesium less than 20 microns with alkali metal in a liquid hydrocarbon medium used as a jet fuel in the after burner of a jet propulsion device (Column 2, lines 5 through 20). Example V of this Patent shows 20 micron magnesium particles (200 parts) mixed with oleic acid (1 part) and polyethylene (6 parts) to make a dispersion of uniformly dispersed magnesium in the fuel of the after burner.

PROBLEMS OF GRINDING METAL SUSPENSIONS TO FORM COLLOIDS IN INVENTOR'S PRIOR PATENT APPLICATIONS

In my prior patent applications, mentioned above, there is disclosed and acknowledged the methods of grinding colloids in a colloid mill and by a grinding device specifically exemplified in WB-1 wherein a 400 mesh magnesium powder is reduced to colloidal dimensions. The recoveries of properly dimensioned colloidal product is low, the procedures are very lengthy, and the practical implementation of the inventions at low cost and in high production is seriously impaired. It is well accepted in the grinding art that high energy requirements, expensive equipment and highly expert personnel are needed to achieve colloidal dimensions by simple fracture and comminution, especially with highly ductive metal such as pure magnesium.

Although the art of arc sputtering metals to form sols is known for about 100 years, there has never been heretofore suggested that by indexing the electrodes which are in the form of elongated rods of uniform cross section into $\frac{1}{2}$ inch scribed markings which are visible to the naked eye, one can sputter away a predetermined length, filter the product and produce by a simple ingenious method a predetermined dosage in a unit dosage package.

DIFFERENCES OF THE PRESENT INVENTION OVER THE PRIOR ART

No prior literature or patent shows indexed electrodes for arc sputtering to prepare a unit dosage package of fuel additive. No prior art shows the dispenser for the package into the fuel system of an automobile, diesel truck or jet aircraft.

OBJECTS OF THE INVENTION

An object of the invention is to provide an improved arc sputtering magnesium colloid manufacturing apparatus mounted in a liquid hydrocarbon carrier, preferably kerosene, for the preparation of colloidal magnesium sol in an inert hydrocarbon suspending agent and is uniquely useful as a unit dosage package for the injection of the colloidal magnesium suspension into the fuel supply or into the fuel line between the fuel tank and the carburetor of an internal combustion engine.

A further object of the invention is to provide an arc welder and sputtering electrode combination wherein sputtering magnesium electrodes generates colloidal magnesium sol from the pure metal rods to create a unit dosage package carrying the magnesium suspension into the fuel line or fuel supply of an internal combustion engine for improved combustion of the fuel.

A still further object of the invention is to provide a new dispensing system for magnesium sol in kerosene for use in diesel engines, gasoline engines and aircraft engines as described in my copending applications, Ser. Nos. 569,320, 568,998, and 568,999, now U.S. Pat. Nos. 4,080,179, 4,080,177, and 4,080,178, respectively.

Other and further objects of the invention will become apparent from the accompanying drawings, the following detailed description and the claims to the improved dosage system for more economically and more efficiently putting my ignition additive systems into practice in automobiles, diesel trucks, and jet aircraft.

SUMMARY OF THE INVENTION (a) Unit Dosage of Sol by Arc Sputtering Scribed Portions In an example of the new method and apparatus for manufacturing colloidal magnesium sol by arc sputtering, ¼ inch square cross section rods of pure magnesium about 8 to 12 inches long are scribed from the bottom at ½ inch intervals and the rods mounted as electrodes in 500 ml of dry kerosene in a container. The rods are fitted as electrodes to an arc welder, the current adjusted to ½ to 1 amp and then the electrodes are sputtered until each electrode loses two ½ inch sections from each bottom rod. The black sol immediately produced is contaminated with about 40% to 60% solidified droplets of irregular shape which are easily removed by filtering through cotton or fiberglass, thereby providing a sol with about 1.7 grams in 500 cc. By sputtering additional ½ inch sections the concentration of sol can be built up to 3 to 4 grams.

(b) Dispensing of Unit Dosage into Fuel Lines of Gasoline Engines, Diesel Engines, or Jet Aircraft Engines The unit dosage colloidal magnesium sol dispensing apparatus is mounted either over the fuel tank or near the carburetor to proportion sol in the fuel. If mounted under the hood of an automobile or similar internal combustion engine powered vehicle the unit dosage package permits gravity flow of magnesium sol prepared by arc sputtering directly into the fuel line between the fuel tank and the carburetor of the engine.

One unit package of 500 cc is the optimum dosage at 1.7 grams of sol for each ten gallons of gasoline, leaded or unleaded, dispensed into the fuel tank or fed into the carburetor. In diesel fuel, the optimum dosage is increased, e.g., one 1000 cc unit package totalling 2.0 grams of sol is optimum for fifteen gallons of diesel fuel. In jet fuel, the optimum dosage is substantially more than in gasoline, e.g., one 5000 cc package of 3 to 4 grams of sol for each 12 gallons of jet fuel.

At 2 to 3 units consumed between markings 28 in FIG. 3, e.g., ½ inch units, the amount of colloidal magnesium sol produced is about 1.6 to 1.7 grams. At 2 to 3 units between markings 28a, e.g., ¼ inch units, the amount is about 0.8 grams.

By adjusting the volume for optimum dosage, volumes of 5000 cc for jet aircraft convert about 6 to 8 units 28 and volumes of 1000 cc for diesel fuel convert about 4 to 5 units 28. Of course, the sol should be measured for each case by evaporating kerosene.

(c) Dispenser Means

The dispenser, which consists of a predetermined volume of colloidal magnesium sol in a concentration required for either gasoline, diesel or jet aircraft engines operating with high octane fuel, is in a container of a size which holds this predetermined volume. A stop cock metering valve is threadedly fitted into the bottom of the container for direct flow into the fuel tank or into the fuel line through a T fitting between the fuel pump and the carburetor.

BRIEF DESCRIPTION OF THE DRAWINGS

FIG. 4 is an enlarged fragmentary view of a fuel tank of a vehicle and a unit package filled dispenser in accordance with the invention.

FIG. 5 is a diagrammatic side elevation of a vehicle with the unit package filled dispenser located in the trunk of the vehicle.

FIG. 6 is a diagrammatic side elevation of a vehicle with the unit package filled dispenser located under the hood of the vehicle.

PRELIMINARY EXPERIMENTAL PREPARATION OF SOL BY ARC SPUTTERING

Prior to perfecting the apparatus for carrying out the invention, the first attempt at arc sputtering employed two ¼ inch square cross section rods of pure magnesium which were held in two laboratory rubber covered clamps, rubber being used for insulation, (not shown in FIG. 1. because the clamps were found to be cumbersome and were discarded) each mounted on a ringstand in a V relation from the two ringstands, said clamps being placed to immerse the rods in a beaker at an angle of 10 to 15 degrees. The rods were immersed to a depth of about two inches in about 500 ml round bottom beaker partially filled with kerosene.

Figure 1:
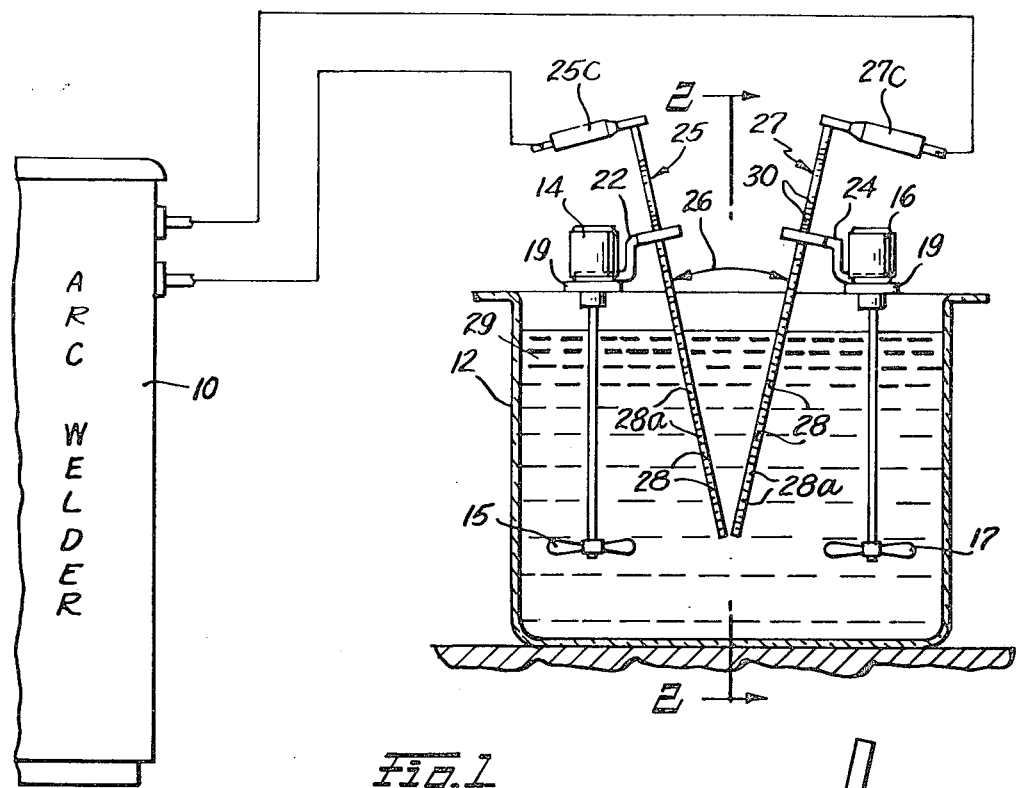
FIG. 1 is a diagrammatic view partly in section showing the preferred apparatus for carrying out the invention.

The leads from an arc welder 10 as in FIG. 1. were attached to the left rod 25 and the right rod 27 by clips in a manner similar to the attachment of clips 25c and 27c in FIG. 1. When the current was turned on from the arc welder 10 in FIG. 1 and adjusted to about 1 ampere the arc formed quickly and heated the tip of each rod to a molten state dropping 3 to 4 mm. sperical beads of pure shiny magnesium to the bottom of the beaker. Simultaneously, a dense black colored cloud quickly filled the kerosene in the beaker, obliterating the view of the two bottom tips in the V position. After about 10 to 12 seconds the arc sputtering operation was stopped, the bead product filtered and weighed, and it was found that only about 2% to 3% of sol was formed with the product being mostly beads. The yield of colloidal magnesium sol was so low that further experiments were made.

The next attempt changed the round beaker to a rectangular transparent container to determine if the arc sputtering could be visually monitored after the initial black sol cloud formed at the tips. It was found that agitation was necessary and the placement of two stirrers to sweep across the front of the V tip where the arc forms effectively permitted visual observation and adjustment of the electrodes. By trial and error it was found that the initial angle of the V at 15 to 20 degrees was too small and that the angle should be between 22 and 30 degrees, preferably about 25 degrees, in order to permit even arcing at low amperage from the arc welder. In this manner the black colloidal magnesium sol was produced in amounts 8 to 10 times the first experiments and instead of 95% of solidified shiny droplets, about 40% to 60% solidified droplets 2 to 4 mm. in diameter of magnesium were formed as byproduct.

DESCRIPTION OF THE PREFERRED EMBODIMENT (a) Arc Sputtering Method and Apparatus The preferred apparatus is shown in FIG. 1 and comprises a transparent rectangular tank 12 of inert insulating material, preferably glass or transparent thermoplastic, partially filled with a predetermined amount of liquid kerosene 29 into which the electrodes of pure magnesium are immersed. These comprise a left electrode 25 and a right electrode 27.

Pure magnesium is readily available as commercially pure magnesium at a purity of 99.9% mg. with less than 0.003% aluminum and copper impurity, about 0.03% or less of iron impurity, about 0.08% manganese impurity, about 0.001% nickel impurity and about 0.005% silicon impurity.

It is preferred to use round $\frac{1}{4}$ inch rods about 14 inches long as the electrodes, but successful experiments were also run with $\frac{1}{4}$ inch square cross sections cut out from 14 inch wide $\frac{1}{4}$ inch thick stock.

As indicated in the early experiments described herein:

(1) visual monitoring of the arc which created the colloidal sol was found to require a critical placement of the rods of between about $\frac{1}{2}$ to $1\frac{1}{4}$ inches, spaced from the inner transparent edge of the shorter side wall; and (2) a critical angle of between about 22 degrees and 30 degrees, preferably 25 degrees, was required in order to provide the smallest amount of loss under conditions of agitation by placing two mixers 14 and 16 on opposite sides of the V rod. Mixer 14 is a left electric motor fitted mixer and mixer 16 is a right electric motor fitted mixer.

The rectangular container 12 has flat upper edges to adapt the mounting of the cross bar holding means 19, used for suspending the right and left mixers 14 and 16 and the electrodes.

In order to position the left electrode 25 and the right electrode 27 at the critical angle 26 between about 22 and 30 degrees, preferably about 25 degrees, support members 22 and 24 are provided for the left electrode 25 and the right electrode 27 respectively. These support members 22 and 24 are shaped as a staggered and backward Z, e.g., an annular base portion, an annular top portion and a mid portion. The bottom of 22 or 24 is an annular base portion which serves the mounting function for the bottom of the electric motor of the left motor fitted mixer 14 or of the right motor fitted mixer 16. The top annular portion is for suspending the left electrode 25 or the right electrode 27 at the critical angle of between about 22 and 30 degrees. To this end the top annular portion is bent obliquely upward in a direction away from the base.

The support members 22 and 24 are formed of suitable insulating material, rubber or plastic, to provide safe operation and assure proper electrical assembly.

To properly mount the left and right electrodes 25 and 27 in the upper annular portion of the holding means 24, effectively constituting an arm of 22 and 24 respectively, a close fitting insulating mounting ring is secured within the said annular arm.

After the left and right electrodes 25 and 27 are mounted at the desired angle of about 25 degrees, clips 25c and 27c from the arc welder 10 are fitted to the electrode tops as shown in FIG. 1.

The arc welder is a Lincoln arc welder with the adjustments for voltage cut down to 70 volts.

(b) Operation of Arc Sputtering

Figure 2:
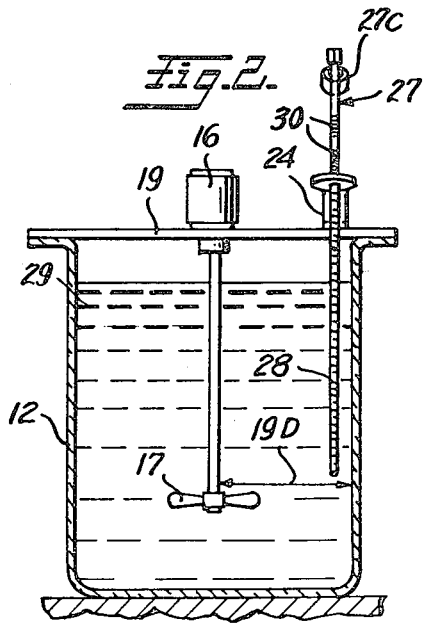
FIG. 2 is a fragmentary vertical section taken along line 2—2 of the apparatus in FIG. 1.

With the fitted electrode already described positioned about $\frac{3}{8}$ inch from the transparent front edge and as shown in FIG. 2, the creation of the arc occurs under 70 volts DC at a separation of about $\frac{1}{4}$ inch while the arcing is continued for 30 to 45 seconds, during which time the mixers drive away the black cloud of sol particles created at the arc to permit visual observation.

In this 45 second interval about $\frac{1}{4}$ to $\frac{3}{8}$ inch of magnesium rod is consumed from the bottom of each electrode.

During operation, the operator, wearing heavy gloves, needs only once to gently push down each rod to maintain the gap at about $\frac{1}{4}$ inch.

If the gap goes beyond $\frac{3}{8}$ inch more beads form which cuts down the yield of the sol.

As a result of a number of trial runs it was discovered that, based upon the density of the 99.9% magnesium electrode which is 1.74 grams per cubic centimeter, about $\frac{1}{4}$ inch of the $\frac{1}{4}$ inch rod is consumed at each about 2 minute interval operating at the slowest possible rate, a rate required to prevent excessive formation of magnesium globules.

It is believed that the arc under the cooling conditions afforded by mixing by the high speed rotation of propellers 15 and 17 adjacent and along the precise site of formation of molten magnesium (melting temperature of about 650 degrees centigrade) creates a vapor phase dispersion of colloidal magnesium particles, each of these particles being surrounded by liquid kerosene which is non-conducting and relatively inert. In short, the arc creates a plasma of very fine particles of colloidal dimensions of magnesium metal which would tend to agglomerate and coalesce with other particles to form larger particles if there were not immediate mixing and cooling.

Observation of repeated runs provided the basis for an indexing discovery, namely, scribing the bottom portion of the magnesium rod at $\frac{1}{4}$ inch intervals could serve as a rough indication of the concentration of magnesium sol produced. About $\frac{1}{4}$ inch intervals of magnesium corresponds to about $\frac{1}{2}$ the amount required as a unit dosage for gasoline in my copending application, Ser. No. 569,320, now U.S. Pat. No. 4,080,179.

It has been found that the propellers must be placed below the arc to create vigorous high mixing forces and drive away the sol particles as soon as they are formed. Also, the placement of the propellers behind the electrodes is of importance to achieve the optimum "dispersion freezing effect" of the colloidal particles of magnesium sol. As shown in FIG. 2, an optimum spacing 19D exists between the bottom tip of the electrode and the shaft of the propeller 17, this optimum distance being about $1\frac{1}{2}$ inches, between about 1 inch and 2 inches, with the propeller 17 or 15 being about $\frac{1}{2}$ to 1 inch, preferably about $\frac{3}{4}$ inch, below the bottom tip.

Figure 3:
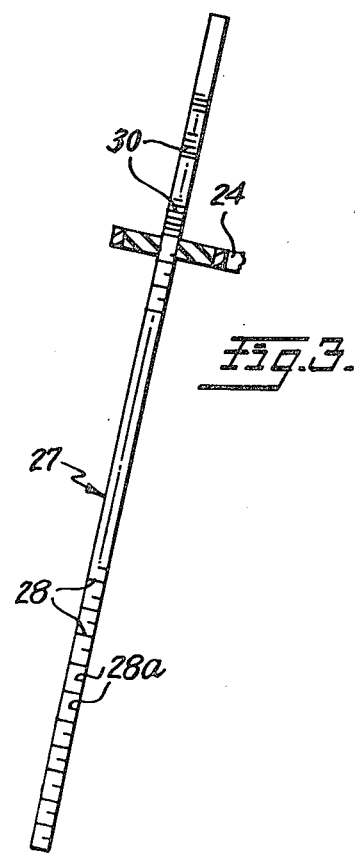
FIG. 3 is an enlarged view of one of the electrodes used in the apparatus in FIG. 5.

A further improvement for process control of the rate of electrode rod consumption of electrodes 25 and 27 is based upon the discovery that scribing of 1/16 inch apart markings 30 on an electrode, e.g., 27 as shown in both FIGS. 2 and 3, permits an indexing of these markings above the top arm of the mounting 24. Thus, at a selected rate of ½ inch, bottom consumption of the electrode 27 in FIG. 3, e.g., the markings 28 in FIG. 3, in a time interval of 2 minutes, the manual downward push adjustment need only be 1/16 downward push in each uniform 15 second interval. This feature of scribing at the bottom of electrode 27 as well as at the top facilitates maintaining production at the optimum condition. Markings 28a are ¼ inch apart.

In the manner just described the critical concentrations for my prior patent applications are as follows:

| Application Serial No. | Date of Filing | Type of Fuel | Optimum Unit Dosage | Kerosene Volume |
|---|---|---|---|---|
| Pat. No. 4,080,179 569,320 | dated March 21,1978 4/17/75 | Motor gasoline | 1.7 grams | 500cc |
| Pat. No. 4,080,178 568,999 | dated March 21,1978 4/17/75 | Diesel fuel | 2.0 grams | 1000cc |
| Pat. No. 4,080,177 568,998 | dated March 21,1978 4/17/75 | Aircraft jet fuel | 3-4 grams | 5000cc |

(c) Filtering and Quality Control

After the desired concentration is achieved the apparatus of FIG. 1 is turned off. To guarantee quality control, the liquid and its contents are filtered through cellulose, wool or glass wool, the beads separated and weighed, the amount of electrode rod consumed noted and the amount of sol determined by sampling an adequate portion of the total and evaporating the sample to dryness. The weight of the sample recovered relates to the whole in the proportion of the adequate amount to the total product. In this manner the above concentrations are obtained and packed in glass containers of the required size, e.g., 500 cc, 1000 cc and 5000 cc.

(d) Dispensing Means

FIG. 4 illustrates a preferred form of dispensing means comprising a dispenser 36 for the fuel tank of an automobile, the dispenser 36 having as its contents a unit package of 500 cc, 1.7 grams of colloidal magnesium, which has been transferred to the interior container portion. The bottom left hand part of dispenser 36 is threadedly fitted with stop cock metering valve 38. The inlet to the stop cock metering valve 38 is at the bottom portion and the outlet flows directly into the fuel tank 32 of the automobile. The mounting of the dispensing means embodiment for the trunk of the automobile is shown in a better view in FIG. 5 where the relative position before the mounting boss 40 and the curved filler line 34 through which the tank is filled at the gas station is illustrated to demonstrate the importance of separating the dosing operation from the gas tank filling operation at the gas station. Note that the dispenser of boss 40 at the base of valve 38 is at least half of the width of the tank and sufficiently far away from the curved filler line to prevent splashing the bottom of the valve. These locations permit partial or complete dosing of the fuel in the fuel tank 32 to assure that the optimum concentration of 1.7 grams is added for each 10 gallons of gasoline, whether said gasoline is leaded or unleaded.

As shown in FIG. 5, the fuel to which the required amount of magnesium colloid is added from the dispenser 36 passes through fuel line 42, through fuel pump 44 and then into the carburetor reference numeral 46.

If it is desired to add ½ or ¾ the amount of colloidal magnesium because the tank is ½ or ¾ filled, based upon a 10 gallon filling, the stop cock metering valve can readily adjust the amount to be added. Refilling the dispenser 36 requires removing the top cap and added the needed amount, 500 cc.

Under the hood dispensing is shown in FIG. 6 wherein the location of the dispenser 36 is now moved under the hood of the vehicle, either a gasoline or diesel powered vehicle. The dispenser 36 is compact enough to fit easily under the hood into T 38 between the fuel pump 44 and the carburetor 46.

A similar design arrangement for the dispenser 36 can be made in carrying out the dispensing method of the invention using electrical arc sputtered colloidal magnesium in kerosene for improving the performance of an aircraft piston engine or for an aircraft jet engine. The dispenser may be used to dose the fuel tank or the fuel line.

In view of the above description, it is seen that the electrical arc sputtering preferred apparatus provides an easily controlled yet ingenious method of producing 0.5 grams up to 4.0 grams per liter of magnesium sol for easy dispensing into the engine of a land vehicle, marine vehicle or aircraft.

Having thus disclosed the invention, I claim:

1. Apparatus for the preparation of a colloidal magnesium sol in kerosene at a concentration of about 0.05 grams per liter up to about 4.0 grams per liter comprising:
  a rectangular transparent tank having a flat upper edge, said tank adapted for holding kerosene and viewing a pair of electrodes in a V relation for arc sputtering;
  a pair of electrodes of uniform cross section in V relation immersed in said kerosene;
  two electric motor fitted mixers, each a single shaft and bottom propeller, one for mixing on each side of the V paired electrodes;
  a cross bar mounting means resting on and across the width of said flat upper edge having mounting apertures for the electrodes and for the two mixers, one placed on each side of said electrodes;
  two reversed Z shaped insulated holder supports, each of said supports being formed with an aperture base portion serving as an anchor about the bottom of the motor of the mixer, a mid portion joining the base and top and an apertured top portion which serves as a mounting arm for an electrode of the V pair;
  said upper arm portion projecting obliquely and upwardly to thereby mount each electrode of the V pair at a critical angle of about 22 to 30 degrees and placing said V pair at about ½ to 1 inch from the transparent front edge of said tank with the propeller below the electrodes and on each side thereof when the electrodes are in the V position for sputtering; and
  scribed markings on said electrodes which enable the visual monitoring of consumption of the electrodes by arc sputtering.

2. Apparatus as claimed in claim 1 wherein said electrodes are circular ¼ inch rods and have scribed markings which are ½ inch apart from the bottom.

3. Apparatus as claimed in claim 1 wherein said electrodes are square ¼ inch rods and have scribed markings which are ½ inch apart from the bottom.

4. Apparatus as claimed in claim 2 wherein said electrodes contain markings at the top which are 1/16 inches apart.

5. Apparatus as claimed in claim 3 wherein said electrodes contain markings at the top which are 1/16 inches apart.

6. Apparatus as claimed in claim 4 wherein the aperture of said mounting arm is fitted with a circular insulating ring for tightly mounting the electrode.

7. Apparatus as claimed in claim 5 wherein the aperture of said mounting arm is fitted with a square insulating ring for tightly mounting the electrode.

8. A method of preparing colloidal magnesium sol in kerosene, said method comprising the steps of:

filling a rectangular transparent tank with kerosene and immersing pure magnesium electrodes in V relation at an angle between about 22 and 30 degrees at the bottom of the V;

placing the angularly adjusted V electrodes within about ½ inch to 1 inch of the front transparent wall to permit visual observation and monitoring of the arc and black cloud formation when the magnesium sol is formed in kerosene;

agitating from below and adjacent the V arc zone by means of propeller agitation to sweep away the black cloud and expose the arc to view;

energizing the electrodes with ½ to 1 ampere current from an arc welder while agitating to view cloud formation;

stopping the arc sputtering after from ½ to 4 inches of the electrode is consumed; and filtering the kerosene containing the sol when a predetermined concentration of sol is obtained to remove beads and droplets of coarse magnesium impurity.

* * * * *